Jan. 5, 1965         W R. HIBBARD, JR., ETAL         3,164,496
           MAGNETIC MATERIAL AND METHOD OF FABRICATION
Filed Sept. 20, 1956                              4 Sheets-Sheet 1
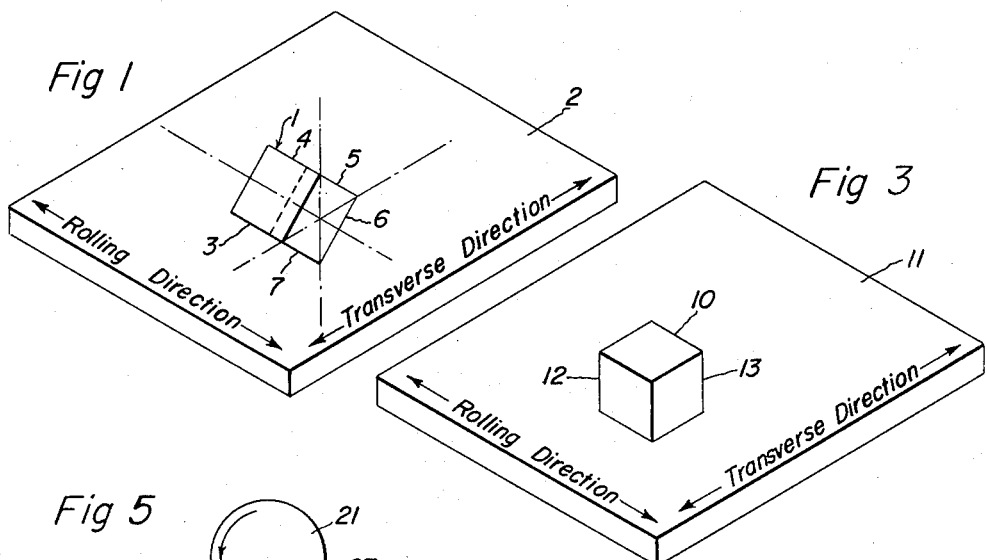
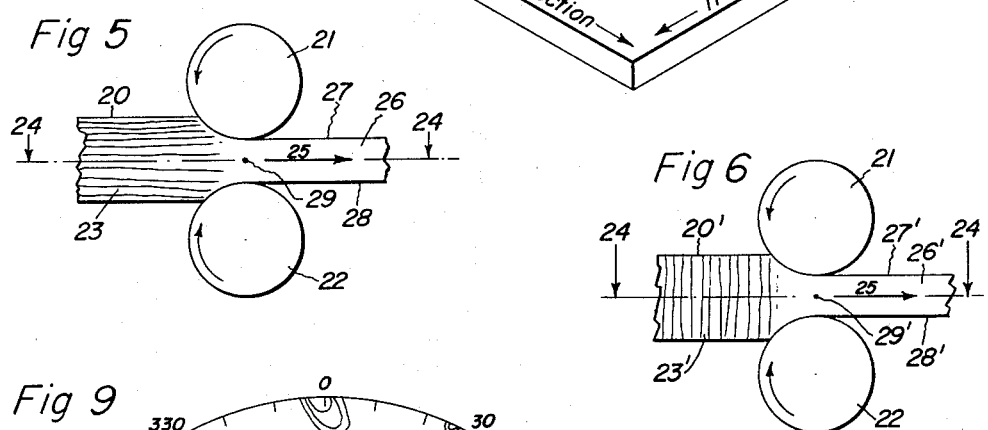
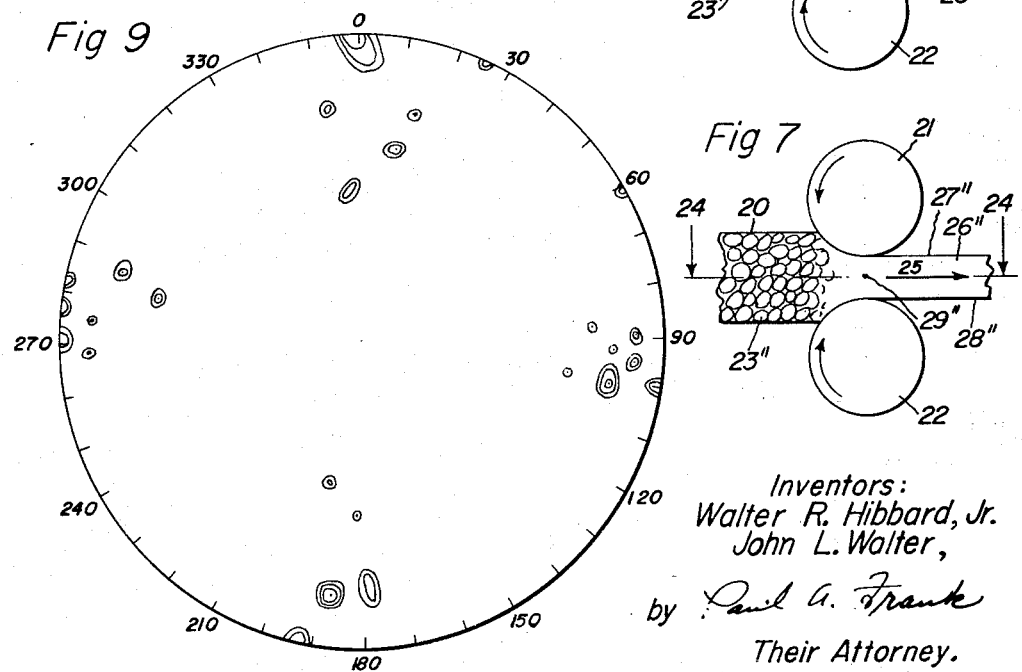
Inventors:
Walter R. Hibbard, Jr.
John L. Walter,
by Paul A. Frank
Their Attorney.

Inventors:
Walter R. Hibbard, Jr.,
John L. Walter,
by Paul A. Frank
Their Attorney.

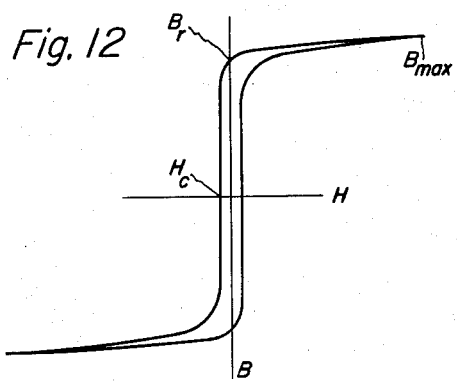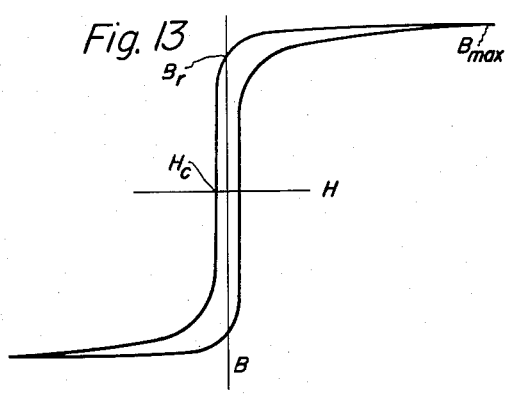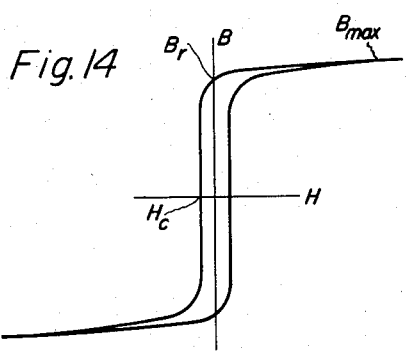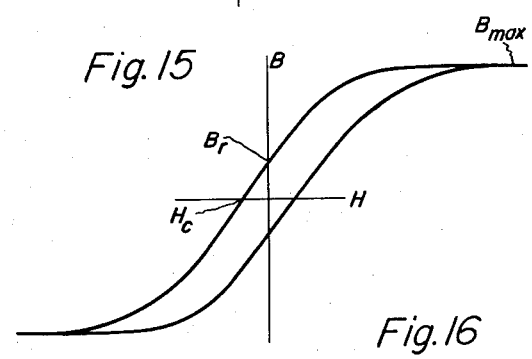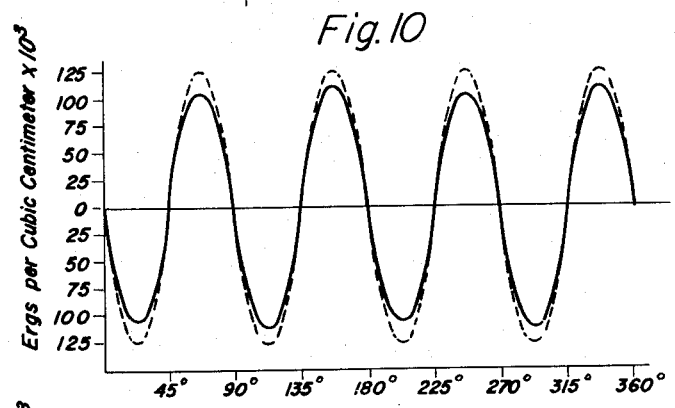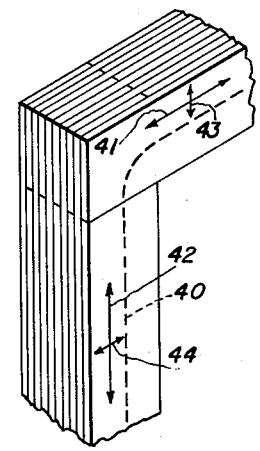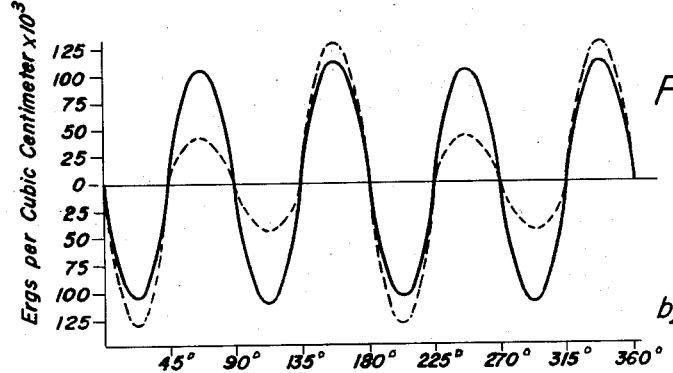
Inventors:
Walter R. Hibbard, Jr.
John L. Walter,
by Paul C. Frank
Their Attorney.

ly of their cube edges are substantially parallel to the

United States Patent Office 3,164,496
Patented Jan. 5, 1965

3,164,496
MAGNETIC MATERIAL AND METHOD OF FABRICATION
Walter R. Hibbard, Jr., Schenectady, and John L. Walter, Scotia, N.Y., assignors to General Electric Company, a corporation of New York
Filed Sept. 20, 1956, Ser. No. 610,909
3 Claims. (Cl. 148—120)

This invention relates to "soft" magnetic materials and more particularly to polycrystalline sheet metal composed of iron and soft magnetic alloys of iron and silicon, iron and aluminum, and iron and molybdenum having cube texture grain orientation and to a method for producing such materials.

Magnetically "soft" materials, as distinguished from magnetically "hard" or permanent magnetic materials are widely used as saturable core materials in electrical and electronic apparatus. Traditionally, iron and iron-base alloys have been used as core materials in power transformers, motors, generators, and like applications. In practice, these cores are usually fabricated from punched or sheered polycrystalline sheet metal elements which are laminated or "stacked" in the desired core shape. As is well known in the art, the shape of laminated cores may vary but almost invariably the resulting core forms one or more closed magnetic paths. In the case of transformer cores, for example, these closed magnetic paths commonly have a substantially rectangular configuration.

Prior to our invention one of the most widely used materials for saturable cores for power apparatus such as transformers, for example, has been silicon-iron polycrystalline sheet metal consisting of an alloy containing up to about 5 percent silicon, low (less than about 0.005 percent) carbon, balance substantially all iron. Similar iron-base alloys consisting of up to about 8 percent aluminum, balance substantially all iron, or up to about 5 percent molybdenum, balance substantially all iron, have been found to have useful magnetic properties in analogous applications. In these alloys the silicon, aluminum and molybdenum additions are believed to function primarily to increase the resistivity of the material in order to reduce core losses due to eddy currents.

The crystalline structures of iron and the silicon-iron, aluminum-iron and molybdenum-iron alloys referred to previously are in the body-centered cubic lattice form at temperatures below several hundred degrees centigrade. These materials all have their easiest direction of magnetization in the crystallographic zone axis direction which corresponds to a direction parallel to a cube edge of the unit cube lattice.

It has been previously observed that by rolling and heat treating silicon-iron alloys to form polycrystalline metal sheet, a high percentage of the grains therein can be oriented with certain of their cube edges parallel to the rolling direction. Sheet material thus produced has quite high magnetic properties including greatest magnetic induction (flux density) for a particular magnetizing force (a ratio expressing permeability) and maximum induction (flux density) possible in a given material (saturation induction), for example, in the rolling direction. Unfortunately in the transverse to rolling direction these magnetic properties are significantly lower. This longitudinal orientation of desirable magnetic properties in this material has enabled transformer cores and the like to be made which have good magnetic properties when the magnetic flux path coincides with the direction in which the material has been rolled. However, where the flux path changes to a direction transverse to the rolling direction, as for example at a 90° corner in a laminated metal core, a substantial portion of the core at that point has relatively poor magnetic properties with a subsequent reduction in core efficiency. For convenience, the terms "longitudinal direction" and "transverse direction" used hereinafter with reference to sheet metal will be understood to mean directions in the plane of the sheet parallel and perpendicular to the direction of rolling, respectively.

For the foregoing reasons and other equally valid considerations, it has been recognized that a polycrystalline sheet material such as silicon-iron having properties of a magnetically soft material in both the longitudinal and transverse directions equal to those previously obtainable only in the rolling direction would be most desirable and useful in electrical power apparatus.

A general object of our invention is the provision of a polycrystalline soft magnetic sheet metal having magnetic properties equal or superior to the best available sheet core material in the longitudinal direction and substantially equally good magnetic properties in the transverse direction.

A more specific object of our invention is the provision of polycrystalline body-centered cubic soft magnetic sheet metal having equally desirable longitudinal and transverse magnetic properties.

A further object of our invention is the provision of a method for making such magnetic material.

A still further object of our invention is the provision of a grain oriented cast intermediate or blank from which such magnetic material may be manufactured and a method for making such a cast intermediate or blank.

Briefly stated, in accordance with one aspect of our invention we provide an improved, soft magnetic material comprising a sheet or strip of a body-centered cubic metal consisting essentially of iron which may be alloyed with an element selected from the group consisting of silicon, aluminum, and molybdenum, by preparing a grain oriented casting or ingot of these materials, rolling and heat treating the grain oriented casting or ingot, or a portion of the casting or ingot, the resulting polycrystalline sheet material having a high percentage of its grains oriented so that their cube edges are substantially parallel and perpendicular to the rolling plane and direction, i.e., each cube edge is either substantially parallel to both the rolling plane and the rolling direction, or parallel to the rolling plane and perpendicular to the rolling direction, or perpendicular to the rolling plane and to the rolling direction. As a result of the recited crystallographic orientation of its grains, this sheet material has desirable magnetic properties in both the rolling and transverse directions.

Our invention will be better understood from the following description taken in connection with the accompanying drawings and its scope will be pointed out in the appended claims.

In the drawings,

FIG. 1 is a schematic representation in perspective of the crystallographic orientation of previously known polycrystalline soft magnetic sheet materials.

FIG. 3 is a schematic representation in perspective of the crystallographic orientation of the polycrystalline soft magnetic materials of our invention.

FIGS. 5, 6 and 7 are schematic illustrations of relationships of the macrostructure of ingots such as illustrated in FIG. 3 to the rolling plane and direction.

FIG. 9 is a reproduction of a typical X-ray pole figure obtained from a representative specimen of the polycrystalline sheet material of our invention.

FIG. 10 is a graphical comparison of the torque characteristics of the polycrystalline soft magnetic sheet material of our invention with the torque characteristics of a single crystal of a material of similar composition.

FIG. 11 is a graphical comparison of the torque characteristics of previously known polycrystalline soft magnetic sheet material with the torque characteristics of the same specimen of the material of our invention shown in FIG. 10.

FIGS. 12 and 13 are reproductions of the direct current magnetic hysteresis loops measured in the rolling direction of a representative sample of the magnetic material of our invention and of a representative sample of a previously known material of similar composition, respectfully.

FIGS. 14 and 15 are reproductions of the direct current magnetic hysteresis loops measured in the transverse to rolling direction of a representative sample of the magnetic material of our invention and of a representative sample of a previously known material of similar composition, respectively.

FIG. 16 is a semi-schematic perspective view of a portion of a typical transformer core.

Figure 2:
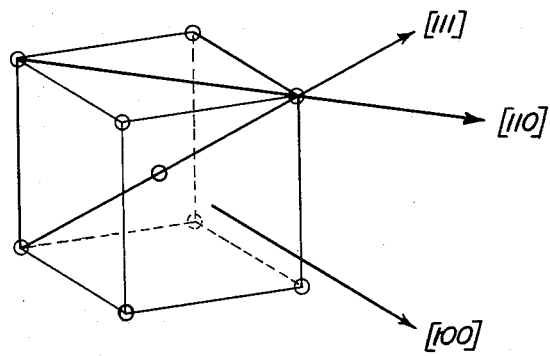
FIG. 2 is a schematic representation of the principal zone axes of a body centered unit cube.

In the detailed description of our invention which follows, comparisons will be made between polycrystalline core materials of our invention, a previously known commercially available polycrystalline core material and a single crystal soft magnetic material, all of comparable chemical compositions. The previously known polycrystalline core material selected for comparison comprised a representative sample of a silicon-iron alloy consisting essentially of 3.25 percent silicon, balance substantially all iron, which has been reduced to 0.012 inch thick sheet by commercial processes to produce conventional high quality "grain-oriented" soft magnetic sheet. The single crystal soft magnetic material consisted essentially of a silicon-iron alloy containing about 3.25 percent silicon, balance substantially all iron, prepared by conventional processes as will be more fully disclosed subsequently.

As is well known in the art, sheet metal materials are conventionally prepared by deforming the material between pairs of parallel, substantially cylindrical rotatable working surfaces or "rolls." As used hereinafter the term "rolling direction" refers to that direction in the sheet material thus prepared which corresponds to the direction in which it proceeded through the rolls. The term "rolling plane" refers to a plane extending between a pair of working rolls parallel to a pair of parallel planes which are tangentially disposed to the cylindrical surfaces of the rolls and which substantially coincide with the rolled surfaces of sheet material which is deformed therebetween.

The production of grain oriented soft magnetic core material has been the object of much research and investigation. The treatment of polycrystalline silicon-iron sheet metal to produce a grain orientation having good magnetic properties in the rolling direction is disclosed, for example, in United States Patent 2,112,084 to Frey et al, among others, which teaches how the orientation schematically illustrated in FIG. 1 of the drawing herewith may be obtained.

In these previously known polycrystalline sheet materials the majority of the grains have been oriented so that their cubic lattices have had substantially the same geometrical relationship to the rolling plane and the rolling direction of the sheet. This relationship has been schematically illustrated in FIG. 1 in which a schematic unit cube 1 having the same orientation as these grains is shown with respect to the rolling direction and rolling plane of a portion of such a sheet 2. It will be understood that the schematic unit cube 1 shown in FIG. 1 is representative of body-centered cubic materials having a space arrangement of nine metal atoms, of which eight are located at the corners of the cube and the ninth is located at the geometrical center of the cube.

This arrangement of atoms in the body-centered cubic lattice system is shown in greater detail in FIG. 2 in which the circles indicate the stated positions of the nine metal atoms constituting the unit cube. The six planes which form the unit cube faces are customarily identified and located with respect to the crystal axes by means of the Miller Crystallographic Index System. A complete discussion of this system may be found, for example, in "Structure of Metals" by C. S. Barrett, McGraw-Hill Book Co., Inc., New York, 2nd Edition, 1952, pages 1 to 25. In this system, the cube faces are generically identified as (100) planes, the planes which pass through a pair of diagonally opposite edges of the unit cube are generically identified as (110) planes, and the planes which pass through a corner atom and through a pair of diagonally opposite atoms located on a face not containing the first mentioned atom are generically identified as (111) planes. As a matter of convenience, directions in the unit cube which are perpendicular to each of these generic planes are customarily referred to as the "crystal zone axis" of the particular planes involved, or more usually as the "[100] direction," referring to the crystal zone axis of the (100) generic plane, and the "[110] direction" and the "[111] direction," to the crystal zone axes of the (110) and the (111) generic planes, respectively. Examples of these directions with respect to the unit cube are shown by the appropriately identified arrows in FIG. 2. As previously stated, the direction of easiest magnetization in these soft magnetic materials is along the cube edges or in the [100] direction while the other directions, [110] and [111] are directions of more difficult magnetization.

As shown in FIG. 1, certain cube edges 3 and 4, for example, are aligned parallel to the direction of rolling and to the rolling plane. However, other cube edges 5, 6 and 7, for example, are inclined at an acute angle to the rolling plane in the transverse to rolling direction. The term "transverse to rolling direction" in this context refers to the direction in the rolling plane 90° from the rolling direction. Stated otherwise, as illustrated in FIG. 1, the cube is arranged "standing on edge" with certain of its edges parallel to the rolling direction and the rolling plane. As illustrated, a (110) plane of the cube lies substantially in or parallel to the rolling plane. Soft magnetic polycrystalline sheet core materials having this grain orientation will be referred to hereinafter as "singly oriented" and conventionally indicated as (110)[001].

As has been previously stated, the [100] crystal zone axis direction, which is perpendicular to the (100) cube face and therefore is parallel to certain of the cube edges, is the direction of easiest magnetization in these body-centered cubic materials. It would appear that such a material having its crystal structure oriented as illustrated in FIG. 1 would have desirable magnetic properties in the rolling direction and comparatively less desirable magnetic properties in the transverse direction. This is found to be true when the magnetic properties of such a material are measured.

It would be advantageous to fabricate polycrystalline sheet metal from iron and iron-base alloys of silicon, aluminum and molybdenum having all or a high proportion of their grains oriented as illustrated in FIG. 3. In this figure, the cubic lattic configuration of the material is schematically illustrated in a manner similar to FIG. 1 but showing an orientation in which the cube edges of the unit cube 10 are all aligned parallel and perpendicular to the rolling direction and the rolling plane of a metal sheet 11. It may be seen that in this orientation, four of the six cube faces are perpendicular to the rolling plane. Further that two of these four faces are parallel to the rolling direction and the other two of these faces are perpendicular to the rolling direction. The remaining two cube faces are parallel to the plane of sheet 11. From this it is apparent that the directions of easy magnetization of such a sheet material, i.e., along the cube edges, would coincide with both the longitudinal and transverse directions and under optimum conditions would be equal. Soft magnetic polycrystalline sheet core materials having this grain orientation will be referred to hereinafter as "cube textured" or as having "cubic orientation" or as "doubly oriented."

Figure 4:
FIG. 4 is a photographic reproduction of the as-cast macrostructure of a representative ingot according to our invention.

We have discovered that polycrystalline body-centered cubic soft magnetic sheet material having a majority of its grains oriented into a cube texture as illustrated in FIG. 3 may be prepared by properly rolling and heat treating castings or portions of castings which have the majority of their as-cast grains oriented with respect to each other and subsequently to the direction of rolling. This orientation in the casting will be referred to as a "columnar" structure and is illustrated in FIG. 4. FIG. 4 is a reproduction of a photomacrograph of a section of a representative ingot according to our invention which has been cast from a molten silicon-iron alloy and the solidification thereof controlled so that it is composed almost exclusively of elongated columnar grains having their longitudinal axes extending substantially in one direction which, as shown in the figure, extends from top to bottom. As shown in the figure, the longitudinal axes of the individual grains seldom coincide exactly with the vertical direction but their deviation therefrom is only by a matter of a few degrees, usually of the order of 5° or less, although a very few grains may be found having a deviation of between 15 and 20°.

We have additionally discovered that the manner in which these longitudinal grain axes are oriented during rolling with respect to the rolling direction and the rolling plane determines the degree of cube texture obtainable in the finished sheet material. As shown in FIGS. 5, 6 and 7 there are three different general relationships to be considered. In FIG. 5 a body of metal 20 consisting of a casting or portion of a casting having a macrostructure composed of columnar grains 23 similar to that illustrated in FIG. 4 is shown being deformed between a pair of driven rolls 21 and 22. The columnar grains schematically illustrated at 23 have their longitudinal axes substantially parallel to the rolling plane 24 and to the rolling direction 25. As shown, as the metal body 20 passes between the rolls 21 and 22, it is plastically deformed and its thickness is reduced. In view of the fact that substantially cylindrical working rolls are used to form rolled sheet metal, it will be obvious that the rolled metal portion 26 is thereby provided with a pair of substantially planar, parallel surfaces 27 and 28. It is to be understood that all subsequent rolling operations which may be performed during the reduction of body 26 to sheet metal of the desired final thickness will be accomplished by passing the reduced body of metal through parallel rolls similar to rolls 21 and 22 with the surfaces 27 and 28 maintained substantially parallel to the axes of the rolls. As will be readily understood by those skilled in the metal working arts, a varying number of such rolling "passes" may be required to accomplish any given degree of reduction of thickness. It will be apparent, however, that the final sheet metal body thus produced will be substantially planar and have a pair of surfaces which are substantially parallel to each other and to the plane of the sheet which are substantially parallel to the original parallel surfaces 27 and 28. For convenience, it may therefore be stated that metal sheet produced in this fashion from a metal body 20 having its columnar as-cast grains 23 oriented with respect to the rolling plane 24 and rolling direction 25 as illustrated in FIG. 5 has been reduced by rolling while maintaining the longitudinal axes of the columnar grains of the original body of metal substantially parallel to the rolling plane and the rolling direction. It may also be noted that this rolling has been accomplished while maintaining the longitudinal axes of the columnar grains substantially perpendicular to the axes of the working rolls as projected upon the rolling plane. This projected axis is shown as a point 29 which will be understood to represent a line extending perpendicular to the plane of the paper.

A different relationship between the longitudinal axes of the columnar grains 23' of a grain oriented casting or portion of such a casting 20' to working rolls 21 and 22 is illustrated in FIG. 6. In this embodiment, unlike that shown in FIG. 5, the longitudinal axes of the grains 23' extend substantially perpendicularly to the rolling plane 24 and to the rolling direction 25. But, similar to the embodiment of FIG. 5 these axes are substantially perpendicular to the projected axes of the working rolls 21 and 22, represented by point 29'. Successive rolling operations to reduce the body of metal 20' to metal sheet are contemplated to be accomplished by passing the body of metal 26' between pairs of parallel cylindrical working rolls as previously stated to successively produce bodies having a pair of substantially planar parallel surfaces, each pair of surfaces so produced being parallel to a pair of previously produced parallel surfaces and each pair of parallel surfaces being substantially parallel to surfaces 27' and 28' of FIG. 6.

The relationship between the longitudinal axes of the columnar grains 23" of a grain oriented casting or portion of such a casting 20" to working rolls 21 and 22 shown in FIG. 7, is different from those shown in FIGS. 5 and 6. In this illustration the longitudinal axes of the columnar grains 23" are arranged parallel to the rolling plane 24 and perpendicular to the rolling direction 25. Further reduction of the body 26" to sheet metal is contemplated to be performed by passing the body of metal between pairs of parallel cylindrical working rolls while maintaining the parallel surfaces thus produced by each rolling operation substantially parallel to similar surfaces produced by a preceding rolling operation and parallel to surfaces 27" and 28". In this illustration it will be noted that the longitudinal axes of the columnar grains 23" are maintained substantially parallel to the projected axes of working rolls 21 and 22, as shown at point 29".

We have discovered that a high degree of cubic orientation may be attained in soft magnetic sheet materials as defined previously by rolling grain oriented castings of the type shown in FIG. 4 in the manner described and illustrated by FIGS. 5 and 6 accompanied by proper heat treatment. Additionally, we have discovered that if substantially identical grain oriented castings are reduced to sheet material by substantially identical procedures except that the longitudinal axes of the cast grains are oriented with respect to the rolling direction and plane as shown in FIG. 7, the resulting sheet material has a significantly poorer cubic texture and much poorer magnetic properties.

As previously stated, the longitudinal axes of certain of the columnar grains of oriented castings of the type shown in FIG. 4 may deviate from parallelism with the mean direction of the columnar axes of all the grains of such a casting by a substantial amount without materially reducing the cube texture of the rolled and annealed sheet metal produced therefrom. We have found, however, that if a grain oriented casting is rolled in the manner illustrated, in FIG. 5, it is preferable that the longitudinal axes of a majority of the columnar grains in the casting 20 do not deviate more than about 20° from the direction of rolling 25. If a grain oriented casting is rolled in the manner illustrated in FIG. 6, it is preferable that the longitudinal axes of a majority of the columnar grains in the casting 20' do not deviate more than about 20° from perpendicularity to the rolling plane 24. If these limits are exceeded by a majority of the columnar grain axes, less than 50 percent of the grains in the finished polycrystalline sheet material will have the desired cubic orientation.

In the practice of our invention, it is contemplated that it is applicable to soft magnetic materials which crystallize in the body-centered cubic lattice form at room temperature such as iron and alloys of iron containing minor amounts of silicon, aluminum or molybdenum as the principal alloying element. In reducing our invention to practice a number of such alloys were prepared and processed. For example, a number of heats were melted and cast of alloys containing at least 95 percent iron, balance substantially all silicon, aluminum or molybdenum. More specifically, these alloys consisted essentially of from about 2.5 percent to 3.5 percent silicon, balance substantially all iron, from about 3 percent to 5 percent aluminum, balance substantially all iron and from about 3 percent to 4 percent molybdenum, balance substantially all iron. In order to obtain a strong columnar texture in these castings these several heats were cast into elongated tubular molds, the bottoms of which were cooled and the sidewalls of which were raised to an elevated temperature just prior to pouring.

In this apparatus, the superheat and the latent heat of the molten metal was substantially all extracted through the bottom of the mold and only a minor amount of the heat was extracted through the preheated sidewalls of the mold. In this manner, a temperature gradient was maintained along the length of the mold and along the length of the metal contained therein such that the temperature and heat content of the metal at any given lower point in the mold was lower than at any higher point in the mold and the metal solidified from the bottom upwardly in the mold.

Figure 8:
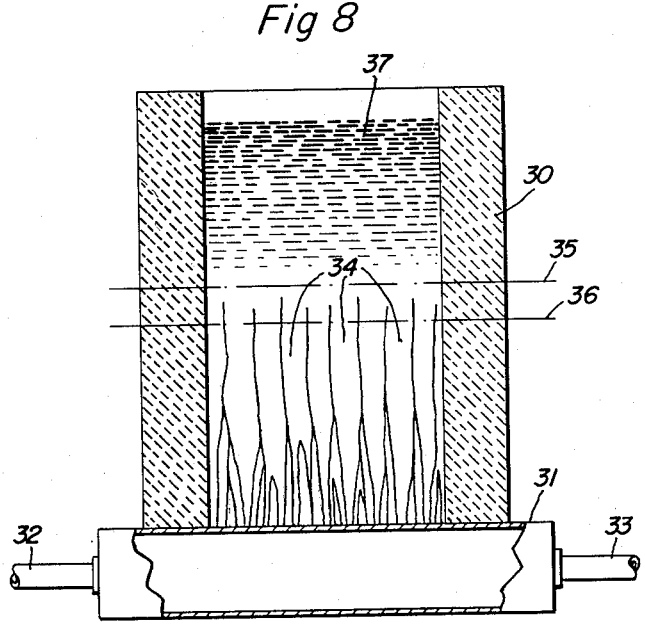
FIG. 8 is a semi-schematic sectional elevation of casting apparatus and a partially solidified casting.

This apparatus is schematically illustrated in FIG. 8 in vertical section with parts broken away to more clearly illustrate the apparatus and the mode of solidification of the casting or ingot therein. In the figure, mold 30 is a tubular element open at the top and bottom and constructed of a refractory material such as fused $Al_2O_3$ or "Alundum." The interior of the tubular mold may have any desired cross-sectional configuration such as circular or rectangular or the like. The bottom end of the mold cavity is closed by the upper surface of a heat extraction member 31 which is preferably constructed of a material having good heat exchange properties such as copper, for example. Member 31 is provided with means for permitting a cooling medium to be circulated in heat exchange relationship for the extraction of heat from said member. As shown, this may be accomplished by making heat extraction member 31 in the form of a hollow body and providing pipes 32 and 33 for circulation of a cooling media such as cold water therethrough. It will, of course, be obvious that other and specifically different means may be employed for extracting heat from member 31 and that the illustrated construction is exemplary only.

In operation of the casting apparatus of FIG. 8, the mold 30 is supported upon heat extraction member 31 as shown and the sidewalls of the mold are heated by any convenient means to a temperature of about 1400° C. while cold water circulating through the heat extraction member 31 maintains the upper surface thereof constituting the bottom of the mold at a temperature of about 20° C. Under these conditions, molten metal is introduced into the mold from the top and heat is extracted therefrom by means of member 31. In view of the temperature and refractory nature of the mold 30, substantially all the heat of the molten metal is extracted through the bottom of the mold and solidification of the metal initiates at the bottom of the mold and progresses upwardly. It has been found that under these conditions of heat extraction, a plurality of columnar grains grow substantially vertically from the bottom of the mold as solidification progresses to form an ingot having the structure shown in FIG. 4. This progressive solidification from the bottom has been schematically shown in FIG. 8 in which the columnar grains 34 are shown growing upwardly from the bottom of the mold to a zone indicated by the spaced dot-dash lines 35 and 36. The zone between the spaced dot-dash lines represents the solidification zone wherein the liquid metal 37 shown above the solidification zone undergoes a phase transformation from the liquid to the solid state. No attempt has been made to illustrate the exact configuration of the liquid to solid interface since no direct observations have been made thereof. It will be apparent that in order for this mode of solidification to occur, a substantially unidirectional transfer of heat must be accomplished through the metal during solidification and that the temperature in advance of the liquid to solid interface must be higher than at any point in the solid phase, and, indeed the temperature in any point in the metal more distant from the heat extraction member 31 must be higher than at any point closer to that member. It may thus be seen that as long as a sufficiently high unidirectional temperature gradient is maintained in the ingot during solidification the metal will solidify in the illustrated manner to form a casting or ingot which is substantially composed of elongated columnar grains having their longitudinal axes substantially parallel and co-extensive with the flow of heat or temperature gradient.

The elongated ingots cast by this procedure were composed almost exclusively of elongated columnar grains having their axes extending in a direction substantially perpendicular to the bottom of the mold and substantially parallel to the longitudinal axis of the ingot. FIG. 4 is a reproduction of a photomacrograph of a representative ingot cast in this manner which has been sectioned along its longitudinal axis and which illustrates the elongated columnar grains. As shown the portion at the bottom of the photograph was adjacent to the bottom of the ingot mold. In order to correlate the structure shown in the photograph to the actual size of the grains it may here be noted that the area shown in the photograph represents an area on the ingot section which measured approximately 5½ inches in the vertical direction and approximately 4 inches in width. It will be appreciated, of course, that not all of the ingots so-cast exhibited the precise grain configuration illustrated in FIG. 4. In fact, in some of the ingots the columnar grains were more regular and more nearly parallel to each other than those shown in FIG. 4. However, the reproduction shown in FIG. 4 is representative of an average, good, columnar-grain ingot obtained by this casting procedure.

As previously stated, we have discovered that polycrystalline soft magnetic sheet material having a high degree of cube texture may be formed by properly rolling and heat treating such grain oriented castings or portions of such castings.

In general, according to our invention this cast material may be heated to an elevated temperature and reduced by means of a series of rolling operations to a strip of intermediate thickness, subjected to an intermediate heat treatment, cooled, cold rolled to form a sheet of a final predetermined thickness, and subjected to a final heat treatment. It will be understood that the number of rolling operations required to reduce the material to the intermediate thickness will depend upon the initial thickness of the cast material and the desired intermediate thickness of the rolled strip as well as the initial temperature to which the cast material was heated prior to rolling. Further, the desirable intermediate thickness of the rolled strip will depend upon the desired final thickness of the finished sheet material. We have found that a cold reduction of about 40 percent or more is desirable between the intermediate and final thickness.

More specifically, slabs having substantially parallel faces and ranging from about 0.300 inch to about 1.0 inch thick were cut from the grain oriented ingots previously described. Some of these slabs were cut so that the parallel faces were substantially parallel to the longitudinal axes of the columnar as-cast grains while others were cut with their faces substantially perpendicular to the longitudinal axes. These slabs were heated to from about 700–1100° C. In this regard the temperature to which the slabs were heated was regulated by the thickness of the perpendicular slab. For example, slabs about 0.300 inch thick were heated to a temperature range of about 700° C. to about 960° C. while the 1.0 inch thick slabs were heated to a temperature range of about 900° C. to about 1100° C. These so-heated slabs were then passed between the rolls of a rolling mill without reheating to effect a reduction of from about 90–97 percent in several passes. For example, the 0.300 inch thick slabs were reduced in from about 7 to 11 passes to a thickness of from 0.020 to 0.030 inch thick while the 1 inch thick slabs were reduced to a thickness of from about 0.030 to 0.045 inch thick in a similar number of passes. It will be understood that while the first two or three passes of these rolling sequences may be considered to be truly hot rolling, the intermediate passes would be classified in the art as warm rolling and the final rolling passes were accomplished at low enough temperatures to be classified as cold rolling. The strip material so-produced was then given an appropriate annealing treatment, for example, by annealing in a dry hydrogen atmosphere ranging from about 4 hours at 1000° C. to about ½ hour at 1200° C. After cooling the material was then cold reduced by rolling in a plurality of passes to the final thickness. For the purpose of comparison and for the purposes of this disclosure the final thickness selected was 0.012 inch. This cold reduction involved at least a 40 percent cold reduction. The 0.012 inch thick strip so produced was then given a final annealing treatment in dry hydrogen in which the finished sheet material was heated to a temperature of from 1150° to 1250° C. and preferably at about 1200° C. after which the material was furnace cooled at the rate of about 100° C. per hour down to a temperature of the order of 200° C. and then air cooled. It should be here noted that while the carbon content of the cast ingots was of the order of about 0.04 percent or less the hydrogen anneals reduced the carbon content so that the finished sheet material contained about 0.002 percent carbon or less.

It was found that finished sheet materials so processed from the previously mentioned slabs in which the longitudinal axes of the columnar as-cast grains were maintained in a direction substantially perpendicular to the projected axes of the working rolls during rolling as previously described and shown in FIGS. 5 and 6 had a majority of their grains oriented in a manner shown in FIG. 3, i.e., these materials had a strong cube texture, while the finished sheet material which had been rolled with the axes of the columnar grains maintained substantially parallel to the projected axes of the working rolls as shown in FIG. 7 did not have this desirable orientation. It was further discovered in the case of rolling this material according to the manner illustrated in FIG. 5 that contrary to expectation, a few "cross-rolling" passes, i.e., passes in which the axes of the longitudinal grains were arranged parallel to the projected axes of the rolls as illustrated in FIG. 7, could be tolerated without appreciably effecting the cubic orientation of the final sheet, provided these cross-rolling passes were accomplished early in the rolling schedule, preferably during the hot or warm rolling phases and provided that the majority of the rolling reduction was accomplished with the direction of the longitudinal axes of the as-cast grains maintained substantially perpendicular to the projected axes of the working rolls.

The sheet materials resulting from the foregoing processing schedules were evaluated by X-ray diffraction spectroscopy, torque magnetometer measurements and direct current hysteresis measurements.

The determination of the crystallographic orientation of polycrystalline aggregates is conventionally accomplished by means of X-ray diffraction techniques, as is well known in the art. Briefly, a polycrystalline specimen is exposed to a collimated beam of X-rays and the intensity of the reflected or diffracted X-ray beam is measured. By appropriately positioning the specimen with respect to the incident X-ray beam, a number of X-ray diffraction measurements which include substantially all of the grains of the specimen may be made which may be plotted on a stereographic projection net. The resulting plot is referred to in the art as an "X-ray diffraction pole figure." The characteristics of such a pole figure reveal the presence of "preferred orientation" of the crystal lattices comprising the several grains of the polycrystalline sample. A complete discussion of the stereographic projection of crystal structures may be found in the previously cited "Structure of Metals," pages 26 to 44 and of the technique for determining X-ray diffraction pole figures and their interpretation, particularly with respect to preferred orientations resulting from working polycrystalline metals on pages 170 to 195 and 442 to 509, op. cit.

An X-ray diffraction pole figure which is representative of typical (100) pole figures of sheet materials of our invention having strong cubic texture is reproduced in FIG. 9. As will be appreciated by those skilled in the art, the central area of the pole figure has not been plotted since reflections in this zone are superfluous in this context. This particular pole figure was obtained by conventional X-ray diffraction techniques from a sample of strip prepared by the foregoing recited procedure from an alloy containing about 2.6 percent silicon, 0.033 percent carbon (as-cast), balance iron. This pole figure demonstrates that the specimen comprises a polycrystalline material in which the majority of the crystals have cube planes substantially parallel to the plane of the sheet and cube edges aligned substantially parallel to the rolling direction. This, briefly, is shown by the concentration of X-ray reflections plotted adjacent the rim of the pole figure and clustered near the reference points 90° (coinciding with the rolling direction), 180°, 270° and 360°. These are plotted reflections of the (100) cube faces and the distribution of these reflections shows a strong cubic texture in the material.

The magneto-crystalline anisotropy characteristics of the magnetic material of our invention was measured on a conventional torque magnetometer. In this test, a disk-like specimen is supported in a unidirectional magnetic field with the axis of the disk perpendicular to the direction of the field. The disk is then rotated in the field and the variation in the amount of torque necessary to rotate the disk about its axis is plotted with respect to the angular deflection from the rolling direction. As is well known and as previously stated, the optimum magnetic properties in crystals of iron and the previously described iron alloys are in the [100] direction or along the cube edges. The next easiest direction of magnetization is in the [110] direction. This direction may be defined as lying in a plane which contains diagonally opposite parallel edges of the cubic lattice structure. For example, in FIG. 3 the plane containing cube edges 12 and 13 extends in a [110] direction. As this specimen is rotated in the unidirectional field in the test it tends to align itself with a direction of easy magnetization parallel to the direction of the field and to resist movement from such a preferred alignment. The degree to which it resists such movement is reflected by the height of the peaks in the plotted curve. The higher the value of the peaks and the nearer to unity the ratio of the heights of the peaks, the better the cube texture, as will be further demonstrated.

The curves shown in FIG. 10 provide a basis for comparing the magnetocrystalline anisotropy of a representative specimen of a silicon-iron sheet material of our invention with a single crystal of silicon-iron. In this figure, the solid line curve was obtained by measuring the magnetic characteristics of a disk specimen 1 inch in diameter punched from cube texture silicon-iron sheet 0.012 inch thick prepared according to our invention. The broken line curve was obtained by measuring the magnetic properties of a disk specimen 1 inch in diameter by 0.025 inch thick prepared from a single crystal of silicon-iron containing about 3.25 percent silicon, 0.03 percent carbon, balance substantially all iron, in which it was determined that the single crystal comprising the specimen had its crystal structure oriented so that a cube face was parallel to the plane of the disk.

The single crystal specimen was prepared from a hot rolled band of silicon-iron of the previously stated composition by the following procedure, known in the art as the "Dunn technique." The specimen comprising a 0.100 inch thick hot rolled band or strip of silicon-iron was heated to about 950° C. and hot rolled to about 0.025 inch thick. The resulting sheet material was then annealed for about 15 hours at 870–900° C. in dry hydrogen. After cooling to room temperature in the hydrogen atmosphere, the annealed strip was strained by elongating it about 2.5 percent. Approximately 3 inches of the end of the elongated sheet was then exposed to a temperature gradient in which the temperature ranged from about 375° C. to about 1375° C. over the 3 inch length for about 12 hours. The strained metal recrystallized during the heat treatment and a few large elongated grains were formed in the temperature gradient zone with their longitudinal axes approximately parallel to the gradient. By X-ray diffraction, an elongated crystal having the desired orientation, i.e., the (100) cube face parallel to the plane of the sheet, was located and the orientation of the [100] cube edge direction of the crystal was determined. The crystals surrounding the selected crystal were cut away leaving the selected crystal attached to the unrecrystallized, fine grained strained sheet. The selected crystal was then reintroduced into and passed through the temperature gradient followed by the strained sheet. The selected crystal grew at the expense of the strained metal and formed a single crystal of known orientation from the remainder of the sheet. The single crystal test specimen was prepared from this single crystal sheet. This specimen differs from the specimen prepared according to our invention principally in that it is composed of a single crystal whereas the material of our invention is polycrystalline.

The sheet from which the specimen represented by the solid line in FIG. 10 was punched was prepared in the following manner.

A charge comprising 22.22 pounds of substantially pure iron containing a maximum of about 0.01 percent carbon, about 0.60 pound of ferrosilicon containing about 96 percent silicon and about 3.0 grams of iron containing about 5 percent carbon was melted in a conventional induction furnace. In this particular furnace, the charge was melted and the temperature of the bath raised to about 1700° C. in a total elapsed time of about 23 minutes. During the melting and heating cycle, an argon atmosphere was provided over the molten bath to minimize oxidation thereof.

The ingot mold used was cylindrical tube of fused alumina refractory, commonly called "Alundum," 12 inches in length and having a 4 inch internal diameter. The tube was supported in a vertical position on a water cooled copper block which served as the ingot mold bottom as shown in FIG. 8. The sidewalls of the ingot mold were heated by means of an electrical resistance heater to about 1400° C. or higher. During this heating period, water was circulated through cooling passages in the copper block so that the surface of the block constituting the mold bottom was maintained at a temperature of 20° C. or less.

After the molten metal had reached its pouring temperature of about 1700° C., the argon atmosphere was removed, the resistance heater was removed from the mold and the molten metal was cast into the heated ingot mold. Sufficient metal was poured into the mold to form an ingot approximately 8 inches long.

In order to prevent the upper portion of the molten metal in the mold from cooling too rapidly, about 1.5 pounds of an exothermic mixture of iron oxide and aluminum, commonly called "thermite," was then charged into the top of the ingot mold. This material reacts to produce a temperature of the order of 4000° C. The quantity of this exothermic material used provided sufficient heat to effectively prevent excessively rapid cooling of the upper portion of the ingot, and to thereby aid in the maintenance of unidirectional heat flow through the cast metal during solidification, as previously pointed out in the discussion relating to FIG. 8. It is to be appreciated that any other means, such as an electric arc, for example, may be used to supply heat to the upper portion of the metal. The solid ingot, when removed from the ingot mold was found to have a grain structure comprising columnar grains quite similar to the structure shown in FIG. 4. The composition of the ingot was found to be about 3 percent silicon, 0.03 percent carbon, balance substantially all iron. It will be understood that the term "balance substantially all iron" as used herein may include impurities such as sulfur, oxygen, nitrogen and manganese, for example, in small amounts up to a total of the order of about 0.1 to 0.2 percent. An elongated rectangular slab about 0.300 inch thick was cut from the ingot in such a manner that the longitudinal axes of the columnar grains thereof extended substantially parallel to the slab faces and to the longest dimension of the slab. The slab was then heated to about 700° C. and rolled in nine rolling passes to about 0.100 inch thick without reheating. The 0.100 inch thick slab was then cold rolled in a plurality of rolling passes to about 0.025 inch thick sheet.

This 0.025 inch thick sheet was annealed at 1000° C. for four hours in a dry hydrogen atmosphere. After four hours at 1000° C., the sheet was allowed to furnace cool under the hydrogen atmosphere at about 100° C. per hour. The 0.025 inch thick sheet was then cold rolled to about 0.012 inch thick sheet. The 0.012 inch thick sheet was then heated at about 100° C. per hour in a dry hydrogen atmosphere to 1200° C., held at that temperature for over 5 minutes and then cooled under the hydrogen atmosphere at about 100° C. per hour. The rolling direction was maintained substantially parallel to the longitudinal axes of the original columnar grains and the rolling plane was maintained substantially parallel to the original slab faces.

In the torque magnetometer test illustrated in FIG. 10, the single crystal specimen was oriented so that the 0° angle point on the abscissa of the graph represents the [100] direction. The points at which the torque curves pass through the zero value with a negative slope of the ordinate represents relatively easy directions of magnetization in the materials. Thus for the single crystal of silicon-iron 0°, 90°, 180°, 270°, and 360° represent the four [100] directions in the single crystal while the points at 45°, 135°, 225°, and 315° represent [110] directions. In this regard the broken line curve in FIG. 10 may be thought of as the result of rotating the cube shown in FIG. 3 about a centrally disposed axis passing therethrough which is perpendicular to the plane of the sheet 11, while impressing thereupon a unidirectional magnetic field which is maintained perpendicular to the axis.

As illustrated, it will be noted that the peak torque values for the single crystal specimen are uniform and have a numerical value of about 123,000 ergs/cc. for a unidirectional field of 1000 oersteds. Since the peaks of this single crystal specimen are all equal in magnitude, the so-called "peak ratio" between adjacent peaks on the same side of the zero ordinate is equal to one indicating a perfect cubic orientation or texture. It should be here noted that the broken line curve in FIG. 10 has been plotted to correct for the difference in sample thickness, as is well known in the art.

The torque magnetometer test curve for the specimen prepared from sheet material prepared according to our invention indicates that the specimen has an almost perfect cubic orientation or texture. The high degree of perfection of cubic orientation is shown by the magnitude and the peak ratio of magnitudes between the peaks of the solid line curve. For example, in a unidirectional field of 1000 oersteds the peak value for that portion of the curve between 45° and 90° is about 105,000 ergs/cc. while the peak value for that portion of the curve between 135 and 180° is approximately 110,000 ergs/cc. It will be noted from inspection of the solid line curve, however, that the material of our invention is nearly symmetrical. In this respect it may be noted that the peak values between 0 to 45, between 45 and 90, between 180 and 225, and between 225 and 270 all have the same value, namely 105,000 ergs/cc., while the peak values of the curve between 90 and 135°, between 135 and 180°, between 270 and 315° and between 315 and 360° all have the peak values of 110,000 ergs/cc. The peak ratio or the quotient of the minimum peak torque value divided by the maximum peak torque value of the material of our invention illustrated in FIG. 10, therefore, may be represented by a numerical factor of about 0.95. This peak ratio and the magnitude of the peaks compared to the peak of the single crystal material indicate that about 85 to 90 percent of the material in the specimen is oriented substantially as illustrated in FIG. 3.

In FIG. 11 the torque magnetometer characteristics of the same specimen of the material of our invention has been plotted for comparison with a specimen of the previously mentioned "singly oriented" silicon strip having a grain orientation as schematically illustrated in FIG. 1. This latter specimen was dimensionally identical to the specimen of the material of our invention, i.e., 1 inch in diameter and 0.012 inch thick. This specimen was obtained from a 0.012 inch thick strip of singly oriented polycrystalline silicon-iron composed of 3.25 percent silicon, .005 percent carbon, balance iron and which, according to present-day standards, has quite acceptable longitudinal magnetic properties.

Upon inspection of the broken line curve in FIG. 11, illustrative of the torque characteristics of this singly oriented material, it may be seen that the magnetocrystalline anisotropy of the material is consistent with its known orientation and magnetic properties, i.e., that the magnetic properties of this material in the transverse direction are significantly poorer than the magnetic properties in the rolling direction. For example, it may be noted that the peak value between 45° and 90° is about 45,000 ergs/cc. while the peak value between 135° and 180° is about 130,000 ergs/cc. for a unidirectional field of 1000 oersteds. The peak ratio is therefore about 0.35 for this material.

In FIGS. 12 to 15 the direct current hysteresis characteristics of material of our invention are compared to the direct current hysteresis characteristics of the singly oriented commercial material referred to previously.

The hysteresis loops shown in FIGS. 12 and 14 illustrate the direct current magnetic behavior of samples of the material of our invention measured in directions parallel and transverse to the rolling direction, respectively, which were prepared as follows. An oriented ingot having a columnar grain structure substantially identical to that illustrated in FIG. 4 was cast as previously disclosed and consisted of an alloy of about 3.0 percent silicon, 0.035 percent carbon, balance substantially all iron. Slabs about 0.300 inch thick having the longitudinal axes of the elongated grains thereof substantially parallel to the slab faces were cut from the ingot. This slab material was heated to 700° C. and rolled in seven rolling passes to about 0.100 inch thick without reheating. The 0.100 inch thick material was then cold rolled in a plurality of rolling passes to 0.025 inch thick sheet.

This cold rolled sheet was then annealed at 1000° C. for four hours in a dry hydrogen atmosphere and allowed to cool under the atmosphere at about 100° C. per hour. It was then cold rolled to 0.012 inch thick sheet and given a final dry hydrogen atmosphere heat treatment consisting of heating at a rate of about 100° C. per hour to 1250° C. holding for about 5 minutes at that temperature and cooling at about 100° C. per hour. The rolling direction was maintained substantially parallel to the longitudinal axes of the original columnar grains and the rolling plane was maintained substantially parallel to the original slab faces.

The direct current hysteresis loops shown in FIGS. 13 and 15 illustrate the magnetic characteristics measured parallel and transverse to the direction of rolling, respectively, of a specimen of the same 0.012 inch thick sheet of commercially available singly oriented silicon-iron from which the specimen for which the torque magnetometer test illustrated in FIG. 1 was obtained.

The direct current magnetic properties of each of the foregoing materials were measured and are listed in Table I, in which, as is conventional, $H_c$ represents coercivity in oersteds, $B_r$ represents remanence or residual induction in gauss, $B_{max}$ represents maximum induction in gauss and $\mu_{max}$ represents maximum permeability. High numerical values of all these properties except coercivity are desirable. The properties of the material of our invention are identified therein by the caption "Cube Texture," while those of the conventional silicon-iron specimen are identified by the caption "Singly Oriented."

*Table I*

MAGNETIC PROPERTIES MEASURED IN THE ROLLING DIRECTION

|  | $H_c$ | $B_r$ | $B_{max}$[1] | $\mu_{max}$ |
|---|---|---|---|---|
| Cube Texture | 0.1 | 13,100 | 15,300 | 90,600 |
| Singly Oriented | 0.1 | 14,100 | 15,750 | 70,500 |

MAGNETIC PROPERTIES TRANSVERSE TO THE ROLLING DIRECTION

|  | $H_c$ | $B_r$ | $B_{max}$[1] | $\mu_{max}$ |
|---|---|---|---|---|
| Cube Texture | 0.135 | 11,650 | 13,300 | 58,700 |
| Singly Oriented | 0.30 | 4,000 | 13,100 | 7,000 |

[1] Measured at H=2.5 oersteds.

From the magnetic properties listed in the foregoing table in conjunction with FIGS. 12 to 15, it will be apparent that the material of our invention has direct current magnetic properties which are equivalent or superior to corresponding properties of the conventional singly oriented material in the rolling direction and vastly superior magnetic properties in the transverse to rolling direction. Further, as is well known in the art, a rectangular configuration of the hysteresis loops of such magnetic core materials is very desirable. This configuration is best illustrated by the hysteresis loops shown in FIGS. 12, 13 and 14. The non-rectangular configuration of the loop shown in FIG. 15 is undesirable in soft magnetic core materials.

While the foregoing specific examples of our invention have been concerned with the production of cube texture in body-centered cubic silicon-iron alloys containing less than 5 percent silicon, the following table gives a few examples of other compositions to show that the previously described schedule of rolling and heat treatment may be equally well applied to other specifically different body-centered cubic materials to produce a soft magnetic sheet material having comparable magneto-crystalline anisotropy.

Table II

| Fe, percent | Si, percent | Al, percent | Mo, percent | Average Peak Ratio | Highest Peak Ratio |
| --- | --- | --- | --- | --- | --- |
| 97.3 | 2.6 | ----- | ----- | 0.80 | 0.90 |
| 97.0 | 3.0 | ----- | ----- | 0.70 | 0.85 |
| 97.0 | 3.0 | ----- | ----- | 0.85 | 0.95 |
| 96.5 | ----- | ----- | 3.5 | 0.72 | 0.82 |
| 96.0 | ----- | 4.0 | ----- | 0.87 | 0.95 |

In the foregoing table oriented cast ingots having the recited composition were cast and a plurality of slabs cut therefrom. The slabs were rolled and heat treated according to the procedures set forth previously to form metal sheets. The magneto-crystalline anisotropy of samples of the sheets were tested in the torque magnetometer and peak ratios therefor were determined. These materials all exhibited magneto-crystalline anisotropy characteristic curves similar in configuration to the solid line curve of FIG. 10. Inasmuch as there was a slight variation from sample to sample from the same ingot, average peak ratios were calculated and listed with the highest peak ratio from a given ingot. It will be seen from the table that the average peak ratios of these specific examples vary from 0.70 to 0.87. However, it will be appreciated that any of these polycrystalline body-centered cubic materials having at least 50 percent of their grains oriented so that their (100) planes are substantially mutually perpendicular to the plane of the metal sheet and to the direction of rolling are useful, novel core materials.

The silicon-iron alloys in the foregoing table were melted and cast according to the procedure set forth in the example recited previously. In these alloys, the silicon was added as ferrosilicon, whereas in the aluminum and molybdenum alloys, the aluminum and molybdenum were added as high purity metals, respectively. Except for the substitution of metallic aluminum and metallic molybdenum for ferrosilicon in the preparation of aluminum-iron and molybdenum-iron alloys, the melting, casting, rolling and heat treatment procedures which were employed were substantially identical to those previously disclosed for silicon-iron. The calculations necessary to formulate a charge to produce an ingot of any particular composition within the purview of this disclosure are deemed to be well within the skill of the metal founding art and will not be discussed further. Further, in view of the known behavior of substantially pure iron, it is obvious that the foregoing processes and procedures are applicable to produce doubly oriented rolled iron sheet.

From the foregoing, it will be apparent to those skilled in the art that the practice of our invention permits the production of polycrystalline, cube texture, soft magnetic sheet material consisting of body-centered cubic metal consisting of iron and silicon-iron, aluminum-iron and molybdenum-iron alloys.

Material having the previously disclosed desirable magnetic properties has many uses as a core material in electrical apparatus. For example, a corner portion of a conventional laminated transformer core is illustrated in FIG. 16. Such cores are conventionally formed from "singly oriented" silicon-iron sheet. The individual laminae are usually cut from rolled sheet material so that the direction of best magnetic properties in the individual laminae are aligned as well as possible with the magnetic flux path. Assume in FIG. 16 that the broken line 40 coincides roughly with the mean magnetic flux path in the core as it might appear projected upon the core's surface. In conventional practice, a 90° corner joint is formed by overlapping the end portions of adjoining laminae, as shown. Further, the crystal orientation of each lamina is such that the easy direction of magnetization, which, in singly oriented sheet material coincides with the rolling direction of the sheet from which it was cut, is arranged parallel to the flux path. This is illustrated by arrows 41 and 42. However, in this singly oriented material, the transverse magnetic properties are significantly poorer, as schematically indicated by arrows 43 and 44. It is obvious that as the flux path turns through 90°, as illustrated, it must pass through considerable core material in the corners of the core which is unfavorably oriented, resulting in a considerable loss of efficiency at such points. It is obvious that in such apparatus, cores made from the material of our invention, having cube texture and practically equivalent transverse as well as longitudinal magnetic properties, would not have this undesirable feature. This is particularly advantageous since, as has been demonstrated previously, the cube texture material of our invention has longitudinal magnetic properties equivalent to singly oriented material of approximately the same composition.

While in certain of the specific examples previously recited, a hot, warm and cold rolling sequence has been disclosed in the initial working of the grain oriented ingot, it should be noted at this point that cube texture may be developed in the materials of our invention solely by cold working a grain oriented ingot or portion thereof and subsequently annealing. In general, hot working of such materials is desirable in order to reduce the power requirements and size of rolling equipment needed to effectively roll thicker sections and further to permit rapid reduction in thickness of such thick sections, but, if desired, the materials of our invention may be produced without depending upon hot or warm rolling.

For example, a grain oriented ingot having an as-cast grain structure similar to that shown in FIG. 4 was prepared according to the previously disclosed casting procedure and by means of the apparatus illustrated in FIG. 8 and which was composed essentially of about 3% silicon, balance substantially all iron. Slabs each having a pair of parallel faces extending substantially parallel to the longitudinal axes of the columnar grains, determining a slab thickness of about 0.040 inch, were cut from this ingot. These slabs were cold reduced about 70% in thickness to form 0.012 inch thick sheet material in a plurailty of rolling passes during which rolling passes the longitudinal axes of the columnar grains were maintained substantially parallel to the rolling direction and to the rolling plane in a manner similar to that illustrated in FIG. 5 and in the previous disclosure related thereto. The so-produced sheet material was then annealed in a hydrogen atmosphere at temperatures varying from 800° C. to 1200° C. for times varying from ½ hour to 16 hours. Torque magnetometer test specimens were cut from this annealed and recrystallized material and torque magnetometer tests, as previously disclosed, were performed thereon. All the specimens were found to exhibit magnetic torque behavior characteristic of the cube texture material of our invention. More specifically, these specimens were found to have maximum torque values as high as 104,000 ergs per cc. and peak ratios of from about 0.76 to 0.90. It is therefore apparent that cube texture material according to our invention may be prepared from grain oriented castings without hot or warm rolling steps.

It will be apparent to one skilled in the art that many variations may be made in various features of our invention within the scope of the appended claims. For example, while we have particularly disclosed a cast ingot having a right circular cylindrical form, it is obvious that other shapes may equally well be cast such as, for example, a prism. Further, it is apparent that grain-oriented ingots prepared according to our invention may be directly rolled without performing a slabbing operation thereon to prepare a billet for rolling. In addition, we have indicated in certain of our specific examples that the blank or intermediate to be rolled constituted a slab having a pair of parallel faces which had been cut from an appropriately grain-oriented casting. It will be apparent to those skilled in the metal-working arts that such faces need only be substantially parallel and may vary by a matter of several degrees from absolute parallelism and still be readily rolled. Furthermore, if a casting is prepared in a mold having tapered sidewalls to permit easy ingot extraction the resulting casting will necessarily have converging sides. Castings of this configuration are conventionally produced and hot-rolled and obviously such a casting produced according to our invention could equally well be directly hot-rolled. Yet further while we have specifically disclosed a method of preparing a grain-oriented ingot by maintaining a temperature gradient along its longitudinal axis during solidification, it is apparent that the temperature gradient may be transversely or laterally disposed if desired or if the configuration of the casting makes such a disposition advisable. Many other variations too numerous to mention will readily occur to those skilled in the art. Therefore, while certain specific examples have been recited in the foregoing specification in order to completely disclose our invention, we do not intend our invention to be limited in any way except as defined in the claims appended hereto.

What we claim as new and desire to secure by Letters Patent is:

1. A method for preparing cube texture soft magnetic sheet metal comprising the steps of providing a casting consisting essentially of iron comprising a plurality of elongated columnar grains having their longitudinal axes extending substantially in a single direction, reducing the casting into sheet metal by a plurality of rolling passes in the majority of which rolling passes the longitudinal axes of the columnar grains are maintained substantially perpendicular to the projected axes of the working rolls and at an angle which is substantially a whole number multiple of 90° to the rolling plane and heat treating the rolled sheet metal to recrystallize the worked metal.

2. The method recited in claim 1 in which the casting is reduced into sheet metal by a plurality of rolling passes in the majority of which rolling passes the rolling direction substantially coincides with the longitudinal axes of the elongated columnar grains.

3. The method recited in claim 1 in which the casting is reduced into sheet metal by a plurality of rolling passes in the majority of which rolling passes the longitudinal axes of the grains are maintained substantially perpendicular to both the rolling direction and the rolling plane.

References Cited in the file of this patent

UNITED STATES PATENTS

| | | |
|---|---|---|
| 1,812,172 | Rohn | June 30, 1931 |
| 1,892,044 | Eldred et al. | Dec. 27, 1932 |
| 1,898,061 | Otte | Feb. 21, 1933 |
| 2,165,027 | Bitter | July 4, 1939 |
| 2,242,350 | Eldred | May 20, 1941 |
| 2,578,407 | Ebeling | Dec. 11, 1951 |
| 2,700,006 | Dunn | Jan. 18, 1955 |
| 2,783,170 | Littmann | Feb. 26, 1957 |
| 2,792,340 | James | May 14, 1957 |
| 2,940,881 | Hollomon | June 4, 1960 |
| 2,992,951 | Aspden | July 18, 1961 |
| 3,008,856 | Mobius | Nov. 14, 1961 |

FOREIGN PATENTS

| | | |
|---|---|---|
| 726,670 | Great Britain | Mar. 23, 1955 |

OTHER REFERENCES

Sixtus: Physics, volume 6, pages 105 to 111, March 1935.